United States Patent [19]

Harada et al.

[11] Patent Number: 5,582,868
[45] Date of Patent: Dec. 10, 1996

[54] PROCESS AND APPARATUS FOR INTERMENT COATING OF A SHEET WITHOUT WRINKLING THEREOF

[75] Inventors: Yoshiro Harada; Kohei Yamamoto, both of Kosai; Kazuhiko Hironaka, Hamamatu; Hiroshi Kobara, Kosai; Eiji Matsui, Yao; Kaoru Okada, Nara; Takenobu Yoshikawa, YamatoTakada, all of Japan

[73] Assignees: Fuji Electrochemical Co., Ltd., Tokyo; Hirano Tecseed Co., Ltd., Nara, both of Japan

[21] Appl. No.: 356,306

[22] PCT Filed: Feb. 28, 1994

[86] PCT No.: PCT/JP94/00319

§ 371 Date: Dec. 20, 1994

§ 102(e) Date: Dec. 20, 1994

[87] PCT Pub. No.: WO95/23031

PCT Pub. Date: Aug. 31, 1995

[51] Int. Cl.⁶ .................................. B05D 5/00; B05C 1/08
[52] U.S. Cl. ..................... 427/287; 427/126.1; 427/116; 427/428; 118/247; 118/249; 118/253; 118/261; 118/263
[58] Field of Search .................. 427/287, 126.1, 427/428, 116; 118/247, 249, 253, 261, 263

[56] References Cited

U.S. PATENT DOCUMENTS 4,704,296 11/1987 Leanna et al. ..................... 118/261

FOREIGN PATENT DOCUMENTS

| 58-124264 | 8/1983 | Japan . |
| 62-25260 | 6/1987 | Japan . |
| 1-184069 | 7/1989 | Japan . |
| 1-194265 | 8/1989 | Japan . |
| 4-242071 | 8/1992 | Japan . |
| 4-78349 | 12/1992 | Japan . |
| 6-34958 | 5/1994 | Japan . |

Primary Examiner—Katherine Bareford
Attorney, Agent, or Firm—Wenderoth, Lind & Ponack

[57] ABSTRACT

A first guide roll, a second guide roll and a backing roll are mounted on a movable frame. A feed roll is disposed substantially perpendicularly below the second guide roll upstream of the second guide roll relative to a direction of movement of a base sheet. The distance between the feed roll and the second guide roll is ninety (90) to two hundred and ten (210) times as long as a distance of travel of the backing roll when the backing roll is moved away from a coating roll.

13 Claims, 7 Drawing Sheets

PROCESS AND APPARATUS FOR INTERMENT COATING OF A SHEET WITHOUT WRINKLING THEREOF

This application is a national stage application of PCT/JP94/00319, filed Feb. 28, 1994.

BACKGROUND OF THE INVENTION

The present invention relates to a process and an apparatus for coating a slurry coating material onto a continuous base sheet at a given thickness, and particularly to a process and an apparatus for intermittently coating a slurry coating material to alternately form coated areas and uncoated areas, each having a predetermined length on a base sheet.

In mass production of, for example, spiral electrode type lithium batteries, the following intermittent coating technique is employed. A band-shaped hoop material of a copper or an aluminum foil approximately 400 mm wide and 10 µm thick is employed as a base sheet for current collectors for such batteries. Slurry mixture containing electrode active material as a main component is used as a coating material. The coating material is applied onto the base sheet, for example, over areas each having a length of 30 cm at a certain thickness, in such a manner that the coating material is not applied at all to subsequent areas, each having a length of 5 cm. Thereby, the coated areas and the uncoated areas, each having the above-mentioned lengths, are alternately formed on the continuous base sheet. Finally, the base sheet is cut at the uncoated areas into a plurality of electrode sheets for the batteries. Each electrode sheet is wound with another electrode sheet constituting another electrode, with a separator therebetween. Then, the resultant wound electrode body is assembled in a battery case.

One known process for carrying out such an intermittent coating operation employs a coating apparatus called a reverse roll coater as shown in FIGS. 10 to 12.

In FIG. 10, the coating apparatus includes, as principal portions, a supplying drum 10 for supplying a base sheet 3, an intermittent coating portion 20 for intermittently applying coating material 6 onto the base sheet 3, a drying furnace 21 for drying the coated material 6 and a take-up roll 22 for taking up the base sheet 3 having passed through the drying furnace 21. As shown in FIG. 11, the base sheet 3 supplied form the supplying drum 10 is guided to the intermittent coating portion 20 by guide rolls 11a, 11b, feed rolls 9 and a guide roll 8.

In the intermittent coating portion 20, as shown in FIG. 12, a coating roll 1 (hereinafter referred to as a C-roll) is rotated at a predetermined speed in a direction indicated by an arrow a, whereas a backing roll 2 (hereinafter referred to as a B-roll) is rotated in a direction opposite to that of the C-roll 1 (i.e., in a direction indicated by an arrow b). The base sheet 3 is allowed to travel in a direction indicated by an arrow c along the B-roll 2 and to pass between the C-roll 1 and the B-roll 2.

An adjuster called a doctor roll 4 (hereinafter referred to as a D-roll) is fixedly (i.e., non-rotatably) mounted above the C-roll 1 and spaced a predetermined distance from the C-roll 1. The coating material 6 accumulated in a hopper 5 is deposited onto a peripheral surface of the C-roll 1, then passes through a region of minimum distance between the C-roll 1 and the D-roll 4, whereby the amount of the coating material 6 applied to the base sheet 3 is controlled at a certain value (in other words, thickness) corresponding to the minimum distance.

A coating layer 6a controlled to the predetermined thickness by the distance between the C-roll 1 and the D-roll 4 is transferred onto the base sheet 3 when the base sheet 3 passes between the B-roll 2 and the C-roll 1. In this manner, a coating layer 6b is continuously formed on the base sheet 3 at a controlled constant thickness.

In order to form uncoated areas intermittently, there is mounted an intermittent moving mechanism for moving the B-roll 2 in a direction perpendicular to a rotational axis thereof. Thus, the B-roll 2 is displaced in a direction indicated by an arrow d at given intervals, until it is sufficiently spaced apart from the C-roll 1 so that the coating layer 6a is not transferred from the C-roll onto the base sheet 3. After a lapse of a predetermined time, the B-roll 2 is moved in a direction indicated by an arrow e back to its original position, and the coating layer 6a on the C-roll 1 is again transferred to the base sheet 3. By repeating these operations, the above-described intermittent coating can be achieved. Then, the intermittently coated base sheet 3 is led over a guide roll 7 to the drying furnace 21. Eventually, the base sheet 3 is taken up by the take-up roll 22 after passing through the drying furnace 21.

However, the above-mentioned existing intermittent coating process may suffer from a problem that it might be almost impossible to accurately apply the coating layer because of unstable travel of the base sheet 3 due to the movement of the B-roll 2 during a transition period from a coating operation to an operation of interrupting coating. When the B-roll 2 is displaced by the C-roll 1, the base sheet is loosened between the guide rolls 7 and 8 since such guide rolls are fixedly disposed. A certain tension is applied to the base sheet 3 by the take-up roll 22, and therefore this looseness usually disappears in short time (for example, in less than half a second). However, since the respective distances between the B-roll 2 and the guide rolls 7 and 8 are short, the angles of deflection of the base sheet 3 spanning rollers 2, 7 and 8 at the points of contact with the rollers 7 and 8, become relatively large. Then, resumption of tightening of base sheet 3 along the B-roll 2 sometimes causes wrinkles or folds around the previously loosened portion of the base sheet 3. Due to these wrinkles and/or folds, the coating material 2 cannot be uniformly applied to the base sheet 3, and a non-uniform coating may be applied thereto. In a mass-production line for the aforementioned spiral type electrode batteries, for example, the following deficiencies may result due to the non-uniformity of coating. Firstly, a paste tends to partially drop off from the sheet at thick coated portions. Secondly, at thin coated portions, a current collector made of a metal foil often may be broken apart by excessive partial rolling. Furthermore, the non-uniform coating may cause incorrect winding during the step of winding the sheet-shaped electrode with a separator into a spiral shape. These phenomena will prevent efficient manufacturing of the batteries. Additionally, even after assembled as complete batteries, optimal electric capacity balance will not be obtained. Specifically, for spiral lithium secondary batteries, active material will not be efficiently available at the non-uniformly coated portions. When there are thick coated portions only on the positive electrode sheet in the secondary batteries, the capacity of the negative electrode becomes relatively smaller than that of the positive electrode. As a result, dendrites may grow at those portions of the negative electrode when the batteries are charged and such dendrites may cause short-circuiting between the two electrodes.

The present invention has been accomplished under such a technical background, and it is an object of the present invention to provide an intermittent coating process and an apparatus therefor, whereby it is possible to ensure stable travel of the base sheet without deformation and to prevent non-uniform coating due to wrinkles or folds in the sheet over the entire coated area.

SUMMARY OF THE INVENTION

To achieve the above objects, an intermittent coating process according to a first aspect of the present invention includes the steps of passing a base sheet between a C-roll and a B-roll with the sheet contacting both rolls, and depositing a slurry coating material on the C-roll and transferring the slurry coating material onto the base sheet. The material is coated onto the sheet intermittently by displacing the B-roll away from the C-roll at a predetermined interval. The base sheet then is passed along the upper surface of a first guide roll, then through a drying furnace, and then the base sheet is taken up by a take-up roll. The first guide roll is moved along with the B-roll when the B-roll is intermittently displaced away from the C-roll.

Preferably, the base sheet is passed between the C-roll and the B-roll while the sheet is in contact with the C-roll and the B-roll after the sheet is passed along the rear peripheral portion of a second guide roll, and the second guide roll is moved along with the B-roll and the first guide roll when the B-roll is intermittently displaced by the C-roll.

More preferably, the base sheet is passed along the second guide roll after being passed along a feed roll located substantially perpendicularly below the second guide roll.

According to a second aspect of the present invention, an intermittent coating apparatus includes a C-roll and a B-roll placed in proximity with each other. A slurry coating material applied on the C-roll is transferred to the sheet by passing the sheet between the both rolls while the rolls are in contact with the sheet. The coating of the coating material onto the base sheet is rendered intermittent by means for intermittently displacing the B-roll away from the C-roll. A drying furnace and a take-up roll are located downstream of the B-roll relative to the path of travel of the base sheet. A first guide roll disposed between the B-roll and the drying furnace is pressed against the base sheet. The first guide roll and the B-roll are mounted on an integral frame, and the frame can be moved intermittently by the intermittent displacing means.

Preferably, a second guide roll is disposed upstream of the B-roll along the path of travel of the base sheet, the base sheet is introduced into the backing roll along a rear peripheral portion of the second guide roll, and the first and the second guide rolls and the B-roll are installed on the integral frame.

More preferably, a feed roll is disposed upstream of the second guide roll substantially perpendicularly below the second guide roll.

According to the above-described intermittent coating process and the apparatus therefor of the present invention, the distance between the first guide roll and the B-roll is maintained constant. Thus, the base sheet is not loosened between the two rolls when the B-roll is displaced away from the C-roll because the first guide roll is moved along with the B-roll. On the other hand, the base sheet would be loosened downstream of the second guide roll between the second guide roll and a guide roll in the drying furnace located downstream of the first guide roll because the B-roll and the first guide roll are simultaneously moved backward. However, the base sheet, to which loosening has occurred, is moved backward around the guide roll located in the drying furnace when the base sheet is moved backward by the tension of the take-up roll. Since the deflection angle of the base sheet is very small, the occurrence of wrinkles or folds in the base sheet is prevented, and thus accuracy of coating of the base sheet is improved.

Furthermore, the base sheet will not be loosened between the B-roll and the second guide roll when the base sheet travels along the second guide roll and passes between the C-roll and the B-roll when the second guide roll is moved along with the B-roll and the first guide roll during intermittent displacement of the B-roll away from the C-roll. Therefore, the base sheet can be conveyed stably and coating accuracy is improved because wrinkles or folds do not occur in the base sheet.

Additionally, when the base sheet is passed along the feed roll located substantially perpendicularly below the second guide roll and then is passed along the second guide roll, a change in distance between the feed roll and the second guide roll is relatively small compared to the distance change when the feed roll is not situated substantially perpendicularly below the second guide roll. Therefore, since the base sheet is not loosened between the feed roll and the second guide roll, the base sheet can be conveyed smoothly and coating accuracy is improved because wrinkles or folds do not occur in the base sheet.

DETAILED DESCRIPTION OF THE INVENTION

Figure 10:
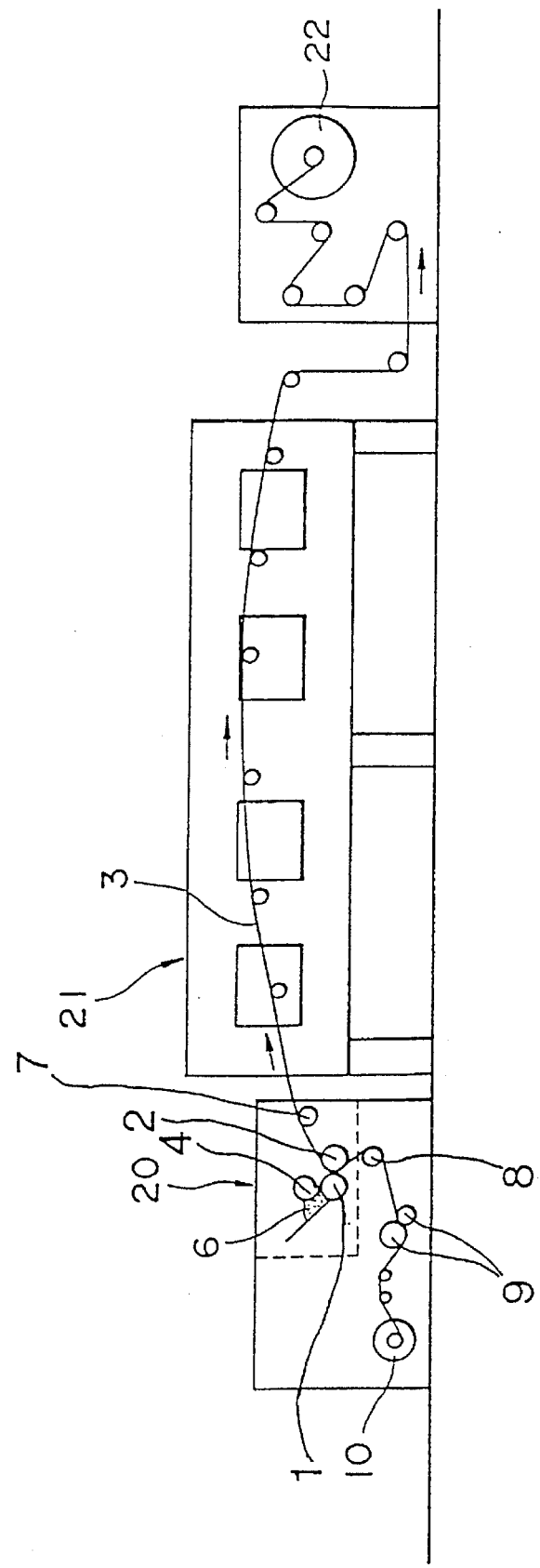
FIG. 10 is a schematic view showing an existing intermittent coating process.
Figure 11:
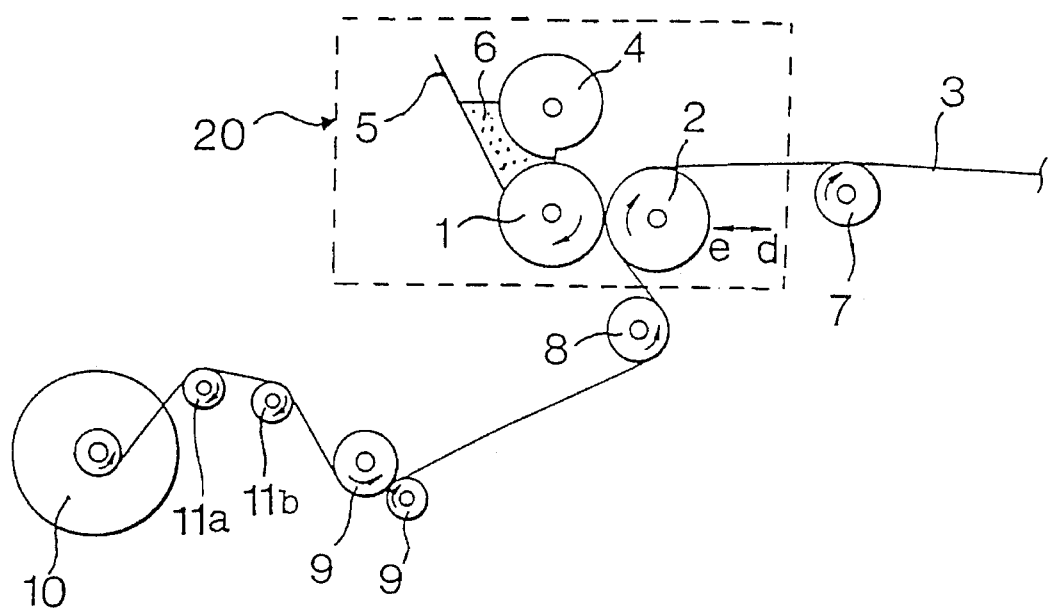
FIG. 11 is a partial enlarged view of the construction of the existing intermittent coating process and an apparatus therefor.
Figure 12:
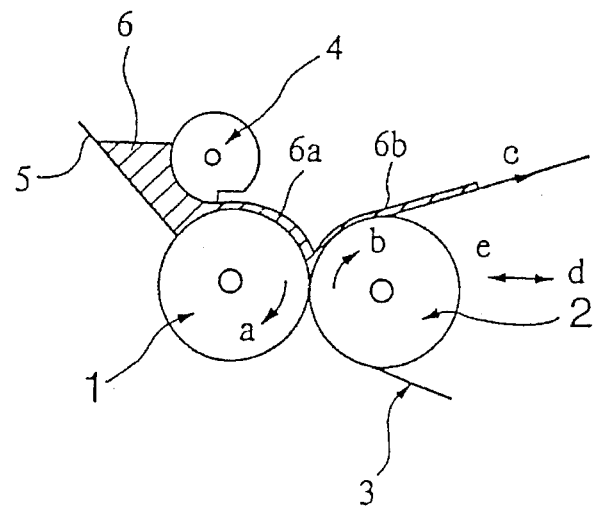
FIG. 12 is a further enlarged partial view showing the existing intermittent coating process.

FIGS. 1 to 9 show an intermittent coating process and apparatus therefor according to a preferred embodiment of the present invention. The components and/or operational processes included in such figures that are the same as or corresponding to those shown in FIGS. 10 to 12 are provided with the same symbols for simplification. The coating material can include an electrode active material as a main component and the base sheet can comprise a band of hoop material including a metal foil.

Figure 1:
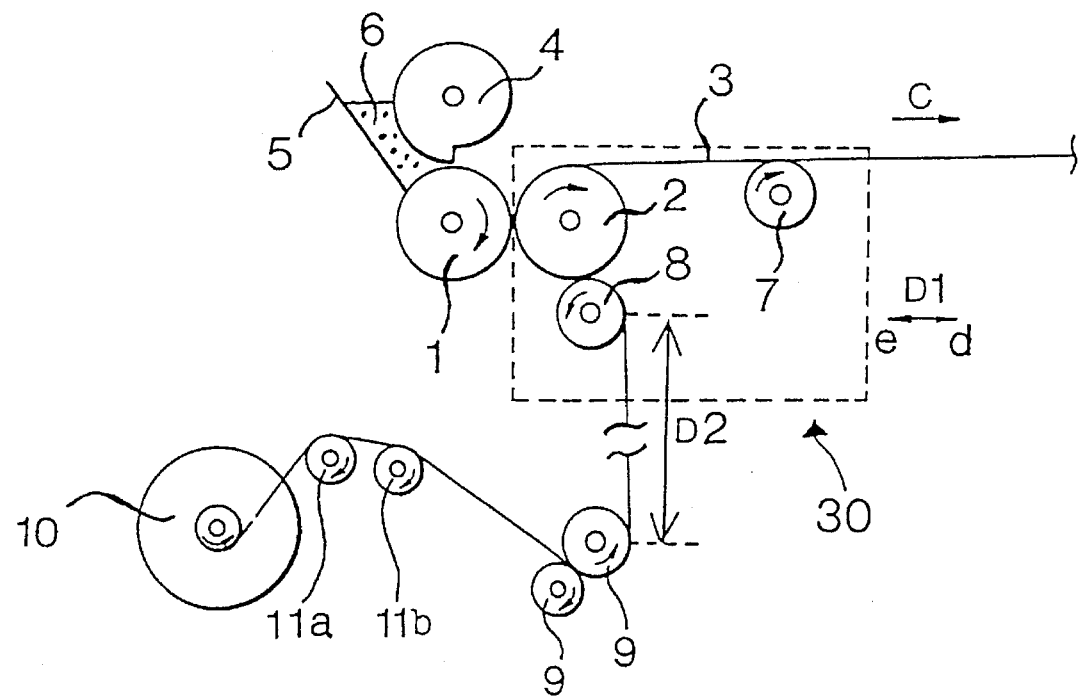
FIG. 1 is a schematic partial view illustrating an intermittent coating process and an apparatus therefor according to a preferred embodiment of the present invention.
Figure 2:
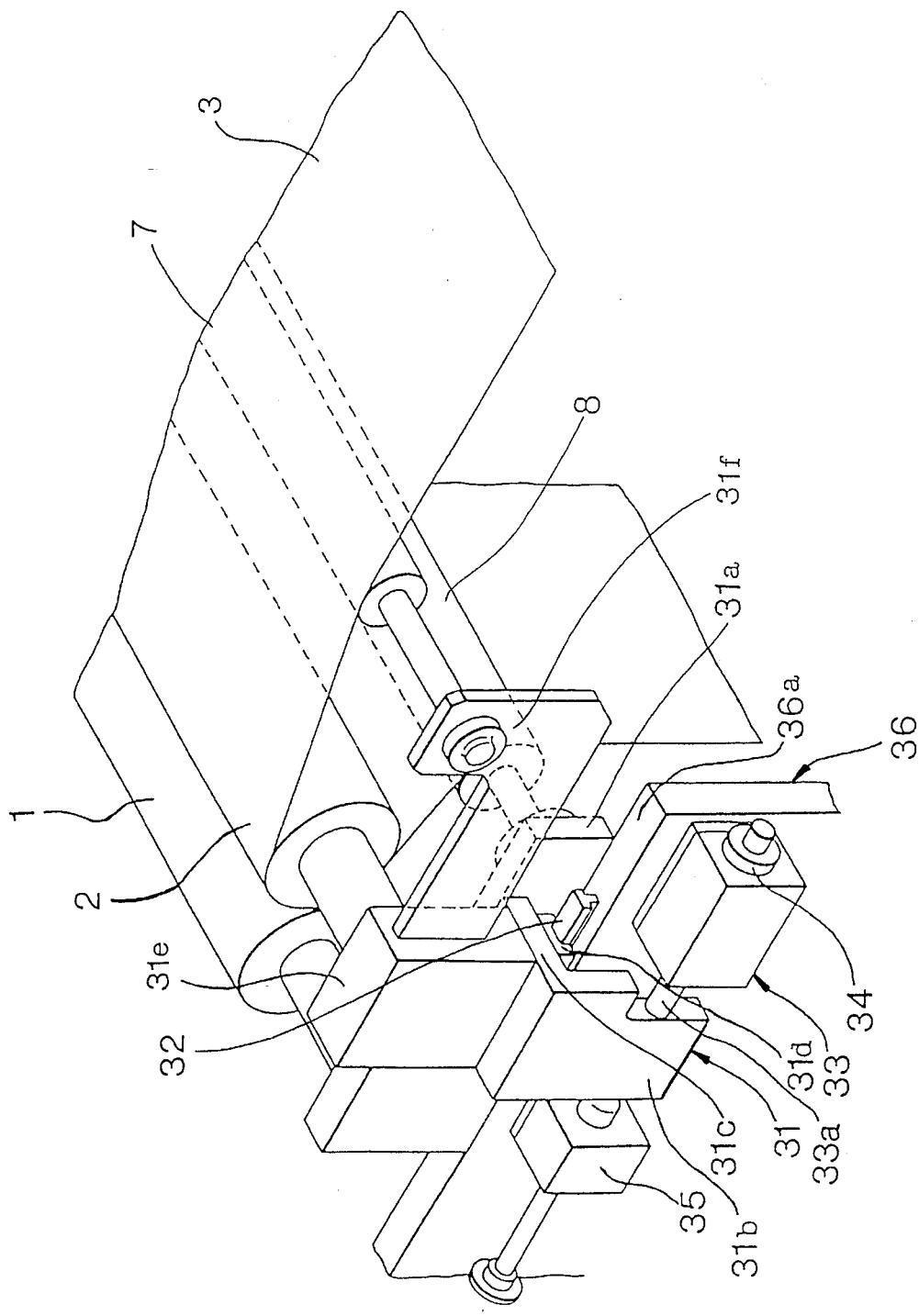
FIG. 2 is a schematic perspective view of principal portions of the intermittent coating apparatus according to the preferred embodiment of the present invention.
Figure 3:
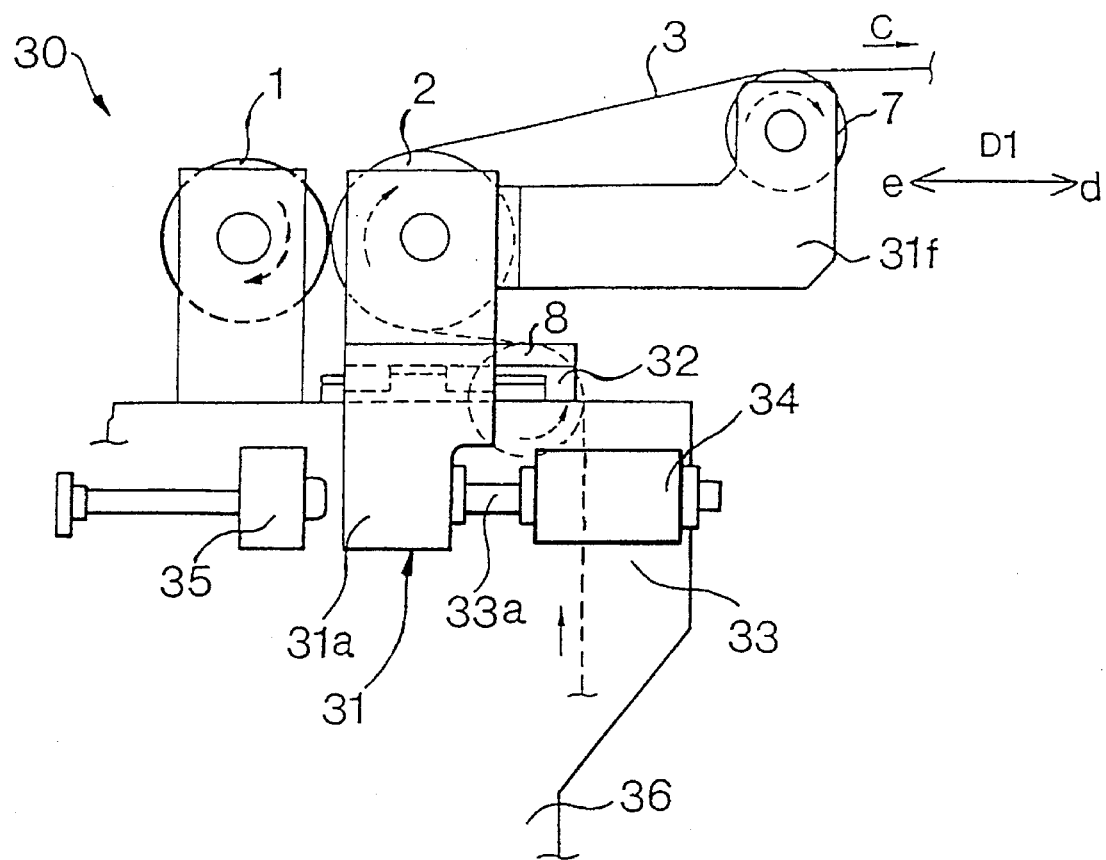
FIG. 3 is an elevation view of principal portions of the intermittent coating apparatus according to the preferred embodiment of the present invention.

As shown in FIG. 1 through FIG. 3, the intermittent coating apparatus of the present invention includes an intermittent moving mechanism 30 for moving a movable frame 31, in which are mounted a first guide roll 7, a second guide roll 8 and a B-roll 2, in horizontal directions (in the directions of arrows e–d) when the B-roll 2 is displaced relative to a C-roll 1.

A feed roll 9 is disposed substantially perpendicularly below the second guide roll 8, and a distance D2 between the feed roll 9 and the second guide roll 8 is set to be ninety (90) to two hundred and ten (210) times as long as a distance of travel D1 of the B-roll 2 (which is equivalent to the traveling distance of the movable frame 31) away from the C-roll 1.

As shown in FIGS. 2 and 3, the movable frame 31 is disposed so as to straddle a wall portion 36a of a fixed frame 36. More precisely, the movable frame 31 includes a horizontal base plate 31c, to which an inner wall 31a and an outer wall 31b are integrally secured so that the wall portion 36a of the fixed frame 36 is located between the walls 31a and 31b. A grooved block 31d is fixed to the base plate 31c at the bottom thereof. The groove formed in the grooved block 31d is slidably mated with a guide rail 32 fixed on the fixed frame 36. A bearing plate 31e is perpendicularly installed on the horizontal base plate 31c. The B-roll 2 is rotatably supported by the bearing plate 31e. On a rear surface of the bearing plate 31e is integrally secured a rearwardly extending L-shaped arm 31f. The first guide roll 7 is rotatably supported at an upper rear end portion of the arm 31f. The second guide roll 8 is rotatably supported by the inner wall 31a of the movable frame 31. On a lower rear surface of the outer wall 31b is mounted an end portion of a piston rod 33a of an air cylinder 33 secured to the fixed frame 36. The air cylinder 33 is a principal portion of the intermittent moving mechanism 30 of the present invention. At a rear end of the air cylinder 33 is attached a stroke adjusting screw 34 of the piston rod 33a. A stopper 35 is secured on the outer side surface of the fixed frame 36 at a location relative to movable frame 31 symmetrical to the air cylinder 33. The C-roll 1 is rotatably supported by a wall of the fixed frame 36 elevated above the stopper 35.

As described above, the B-roll 2, the first guide roll 7 and the second guide roll 8 are attached to the movable frame 31, so that rolls 2, 7 and 8 can move as an integrated unit relative to the fixed frame 36. When compressed air is supplied into a front end portion of the air cylinder 33, and at the same time a rear end portion thereof is depressurized, the piston rod 33a is pulled into the cylinder 33 to move the movable frame 31 and the rolls 2, 7 and 8 mounted thereon rearwardly by a certain distance. Thus, a gap is formed between the C-roll 1 and the B-roll 2. On the other hand, when compressed air is supplied into the rear end portion of the air cylinder 33 and the front end portion thereof is depressurized, the piston rod 33a is pushed out and moved until a position where the movable frame 31 contacts with the stopper 35. At this point of the piston rod 33a, the B-roll 2 is urged toward the C-roll 1 with the base sheet 3 therebetween.

Figure 4:
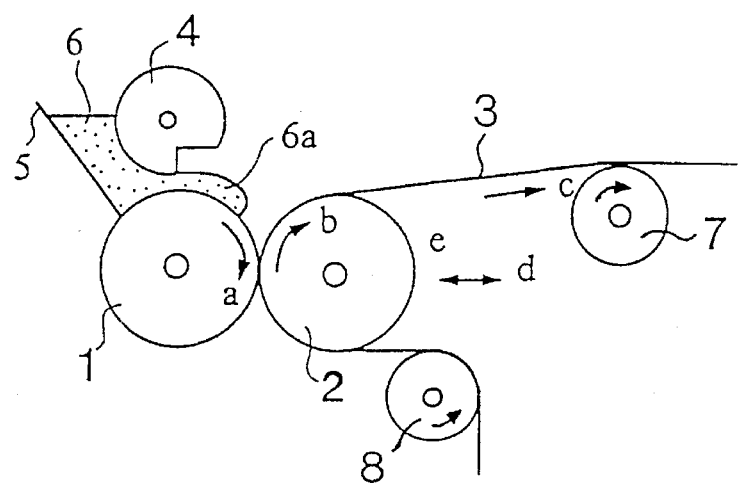
FIG. 4 is an illustration showing the construction and the operation of a first stage of the intermittent coating process and the apparatus therefor according to the preferred embodiment of the present invention.
Figure 5:
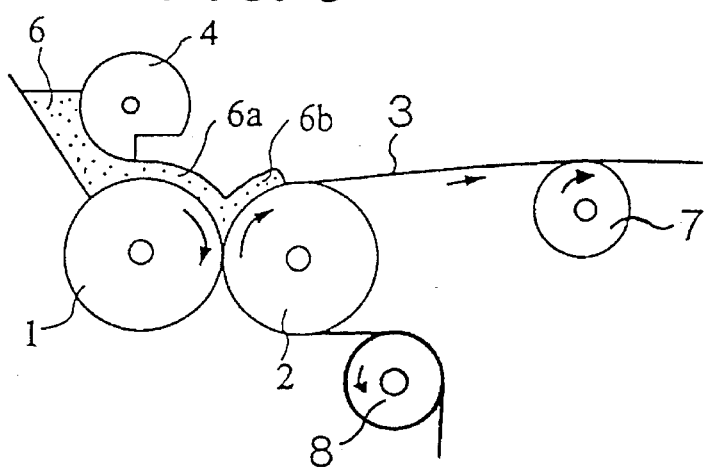
FIG. 5 is an illustration showing the construction and the operation of a second stage of the intermittent coating process and the apparatus therefor according to the preferred embodiment of the present invention.

In the above-mentioned construction of the present invention, as shown in FIGS. 4 and 5, the base sheet 3 is passed between the C-roll 1 and the B-roll 2 while the sheet 3 is in contact therewith at a stage or step for forming coated areas on the sheet 3. During the same step, the distance between the C-roll 1 and the D-roll 4 is set at its largest. A thick coating layer 6a on the C-roll 1, which is defined by the gap between the C-roll 1 and the D-roll 4, is transferred to the base sheet 3 as a coating layer 6b of constant thickness.

Figure 6:
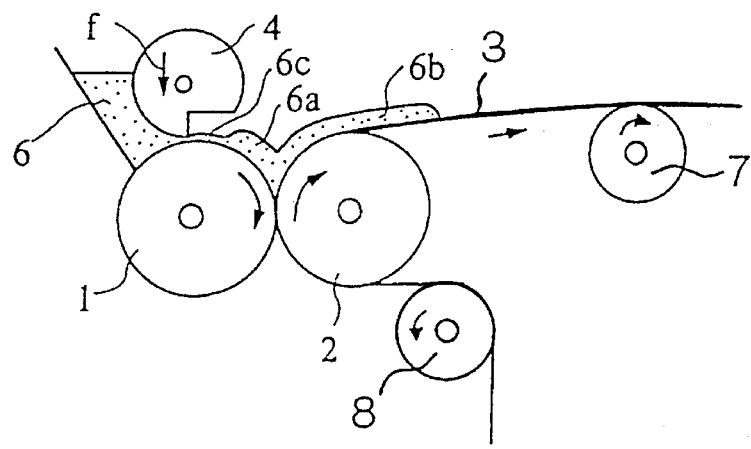
FIG. 6 is an illustration showing the construction and the operation of a third stage of the intermittent coating process and the apparatus therefor according to the preferred embodiment of the present invention.
Figure 7:
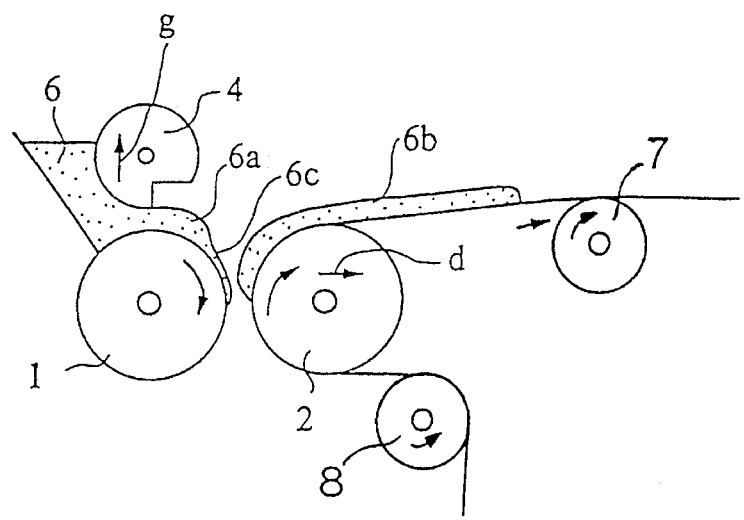
FIG. 7 is an illustration of the construction and the operation of a fourth stage of the intermittent coating process and the apparatus therefor according to the preferred embodiment of the present invention.

Prior to forming uncoated areas, as shown in FIG. 6 the D-roll 4 moves in the direction of the arrow f to approach the C-roll 1. By the gap reduced by the movement of the D-roll 4, a coating layer 6c on the C-roll 1 becomes very thin. When the leading edge of this thin coating layer 6c reaches the point where the coating material is transferred to the base sheet 3, the B-roll 2 is displaced away from the C-roll 1 by movement of the movable frame 31 in the direction of the arrow d by the air cylinder 33 as shown in FIG. 7. The B-roll 2 then is separated from the C-roll 1 at the same time that the transition from the thick coating layer 6a to the thin layer 6c reaches the transfer point on the C-roll 1. Through the steps described above, the trailing or ending edge of the coating layer 6b formed on the base sheet 3 is clearly defined.

As mentioned above, the first guide roll 7 and the second guide roll 8 are moved with the B-roll 2 because the rolls 7, 8 and the B-roll 2 are mounted in the same movable frame 31. Thus, the base sheet 3 is not loosened between the B-roll 2 and both the first guide roll 7 and the second guide roll 8.

Furthermore, as shown in FIG. 1, since the feed roll 9 is disposed substantially perpendicularly below the second guide roll 8 and the distance D2 between the second guide roll 8 and the feed roll 9 is ninety (90) to two hundred and ten (210) times as long as the distance of travel D1 of the B-roll 2 when the B-roll 2 is moved away form the C-roll 1, the base sheet 8 is not loosened between the feed roll 9 and the second guide roll 8.

Therefore, no wrinkles or folds occur in the base sheet 3 because the sheet 3 smoothly travels without any deformation and error in traveling accuracy. It should be noted that the D-roll 4 has returned to the original position by this time, where the distance from the C-roll 1 is larger, by moving in the direction of the arrow g.

Figure 8:
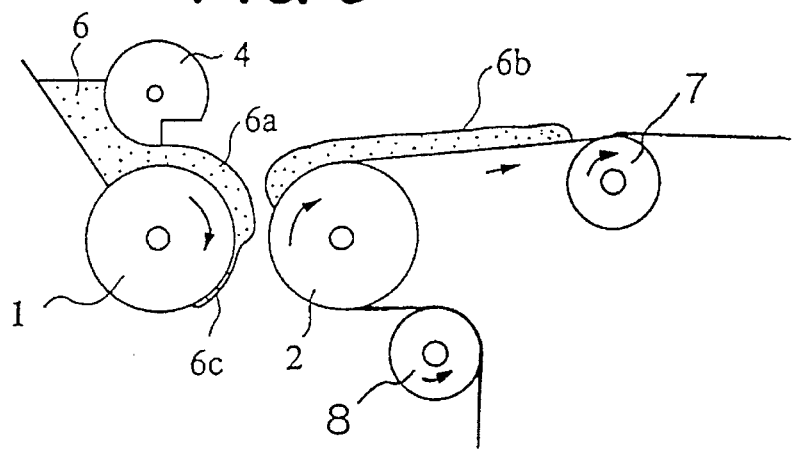
FIG. 8 is an illustration of the construction and the operation of a fifth stage of the intermittent coating process and the apparatus therefor according to the preferred embodiment of the present invention.
Figure 9:
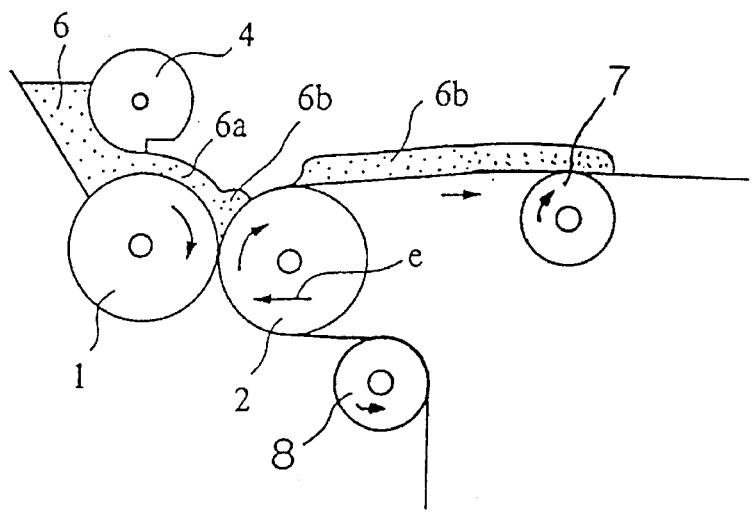
FIG. 9 is an illustration of the construction and the operation of a sixth stage of the intermittent coating process and the apparatus therefor according to the preferred embodiment of the present invention.

A predetermined length of an uncoated area is formed during the transition period from the state of FIG. 7 to the state of FIG. 8. When the thick coating layer 6a again comes to the transfer position on the C-roll 1, the B-roll 2 returns to the position where the distance from the C-roll 1 is smaller while the movable frame 31 moves in the direction of the arrow c. At this time, formation of a coated area on the base sheet 3 is started by transfer of the coating layer 6a from the C-roll 1. Through the operations described above, predetermined intermittent coating is achieved.

In the above-mentioned preferred embodiment of the present invention, the first and second guide rolls 7 and 8 and the B-roll 2 are mounted on the movable frame 31 and are moved together. However, the second guide roll 8 may be mounted on the fixed frame 36 and the first guide roll 7 and the B-roll 2 may be mounted on the movable frame 31, without departing from the scope of the preferred embodiment of the present invention. In such case, as the B-roll 2 and the first guide roll 7 move backward simultaneously, the distance between the B-roll 2 and the first guide roll 7 is maintained constant, and thus the base sheet 3 therebetween is not loosened. When the B-roll 2 and the first guide roll 7 move backward, the base sheet 3 is loosened downstream of the second guide roll 8, specifically between the second guide roll 8 and a guide roll in the drying furnace downstream of the first guide roll 7. However, even when such loosening occurs, the base sheet 3 subsequently moves backward due to the tension of the downstream take-up roll, and the base sheet 3 is pulled backward around the guide roll in the drying furnace. Therefore, the deflection angle of the base sheet 3 at the first guide roll 7 is very small. Thus, occurrence of wrinkles or folds in the base sheet 3 is prevented.

Furthermore, in the above-mentioned preferred embodiment of the present invention, the moving direction of the movable frame 31 is described as being horizontal. However, such moving direction may be obliquely upward or obliquely downward. Such moving directions other than horizontal can be obtained by installing the guide rail 32 obliquely.

As discussed above, according to the intermittent coating process and the apparatus therefor of the present invention, the B-roll and the first guide roll are mounted on the same frame and the first guide roll is moved with the frame when the B-roll is moved. When the base sheet is loosened during such displacement of the B-roll and subsequently is moved backward by the tension of the take-up roll, the base sheet is swung backward at the guide roll in the drying furnace. Since the deflection angle of the base sheet is very small, the occurrence of wrinkles in the base sheet is prevented.

Furthermore, when the second guide roll is disposed below the B-roll and the base sheet is introduced into the B-roll along the rear peripheral portion of the second guide roll, and the first and the second guide rolls are moved along with the movement of the B-roll, the base sheet will not be loosened between the second guide roll and the B-roll when moving backward. Thus, no wrinkles will occur in the base sheet during coating.

When the feed roll is disposed perpendicularly below the second guide roll, the distance from the feed roll to the second guide roll is set to be ninety (90) to two hundred and ten (210) times as long as the distance of travel of the B-roll during displacement of the B-roll away from the C-roll. Loosening of the base sheet between the feed roll and the second guide roll thus may be substantially prevented at the time of displacement of the B-roll.

What is claimed is:

1. An intermittent coating process comprising:

passing a base sheet between and in contact with a coating roll and a backing roll;

depositing slurry coating material onto said coating roll, and transferring the thus deposited coating material from said coating roll onto said base sheet;

passing said base sheet with the thus transferred coating material thereon along a first guide roll and then along a drying device;

after passage along said drying device, taking up said base sheet by a take-up roll;

intermittently interrupting said transferring of said coating material from said coating roll to said base sheet by intermittently moving said backing roll away from said coating roll; and moving said first guide roll with said backing roll during said intermittent movement thereof away from said coating roll.

2. A process as claimed in claim 1, wherein said moving of said first guide roll is achieved in a horizontal direction.

3. A process as claimed in claim 1, further comprising passing said base sheet along a rear peripheral portion of a second guide roll before said passing of said base sheet between and in contact with said coating roll and said backing roll, and moving said second guide roll with said first guide roll and said backing roll during said intermittent movement thereof away from said coating roll.

4. A process as claimed in claim 3, further comprising, before said base sheet is passed along said second guide roll, passing said base sheet along a feed roll disposed substantially perpendicularly below said second guide roll.

5. A process as claimed in claim 4, comprising positioning said feed roll a distance from said second guide roll equal to from 90 to 210 times a distance of movement of said backing roll away from said coating roll.

6. A process as claimed in claim 1, wherein said coating material includes electrode active material as a main component.

7. A process as claimed in claim 1, wherein said base sheet comprises a band of hoop material including a metal foil.

8. An intermittent coating apparatus comprising:

a coating roll to have deposited thereon slurry coating material;

a backing roll positioned adjacent said coating roll, such that a base sheet may be passed between and in contact with said coating roll and said backing roll, and such that coating material deposited on said coating roll is transferred to the base sheet;

a first guide roll, positioned downstream of said backing roll relative to a direction of travel of the base sheet, to guide travel of the base sheet in said direction;

a take-up roll positioned downstream of said first guide roll to take up the base sheet;

a drying device positioned between said first guide roll and said take-up roll; and said backing roll and said first guide roll being mounted on a frame that is mounted for intermittent movement in a direction to intermittently move said backing roll and said first guide roll away from said coating roll, thereby to enable intermittent interruption of transfer of coating material from said coating roller to the base sheet.

9. An apparatus as claimed in claim 8, wherein said direction of intermittent movement of said frame is horizontal.

10. An apparatus as claimed in claim 8, further comprising a second guide roll mounted on said frame for movement therewith in said direction of intermittent movement thereof, said second guide roll being positioned upstream of said backing roll relative to the direction of travel of the base sheet.

11. An apparatus as claimed in claim 10, further comprising a feed roll positioned upstream of said second guide roll at a location substantially perpendicularly below said second guide roll.

12. An apparatus as claimed in claim 11, wherein a distance between said feed roll and said second guide roll is equal to from 90 to 210 times a distance of movement of said backing roll away from said coating roll.

13. An apparatus as claimed in claim 8, further comprising means, operatively connected to said frame, for moving said frame in said direction of intermittent movement.

* * * * *